May 25, 1965 W. B. SPEARS 3,185,279
VENDING MACHINE

Filed Sept. 6, 1963 3 Sheets-Sheet 1

Willard B. Spears
INVENTOR.

BY

May 25, 1965  W. B. SPEARS  3,185,279
VENDING MACHINE
Filed Sept. 6, 1963  3 Sheets-Sheet 2
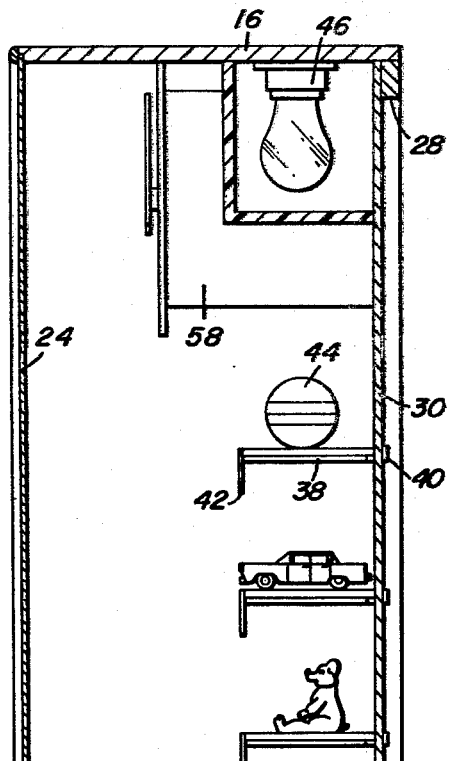
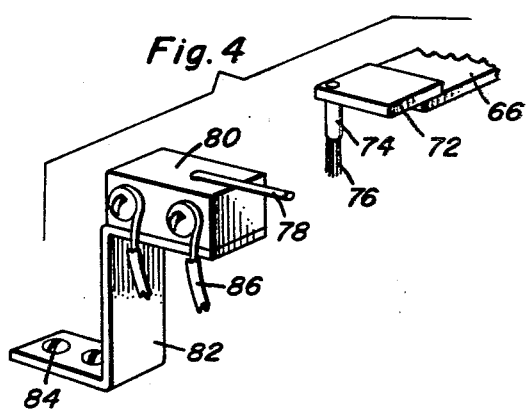
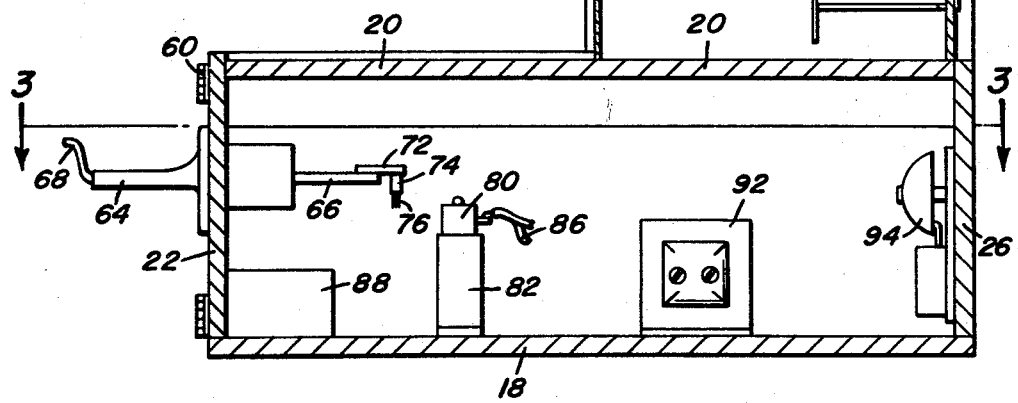
Willard B. Spears
INVENTOR.

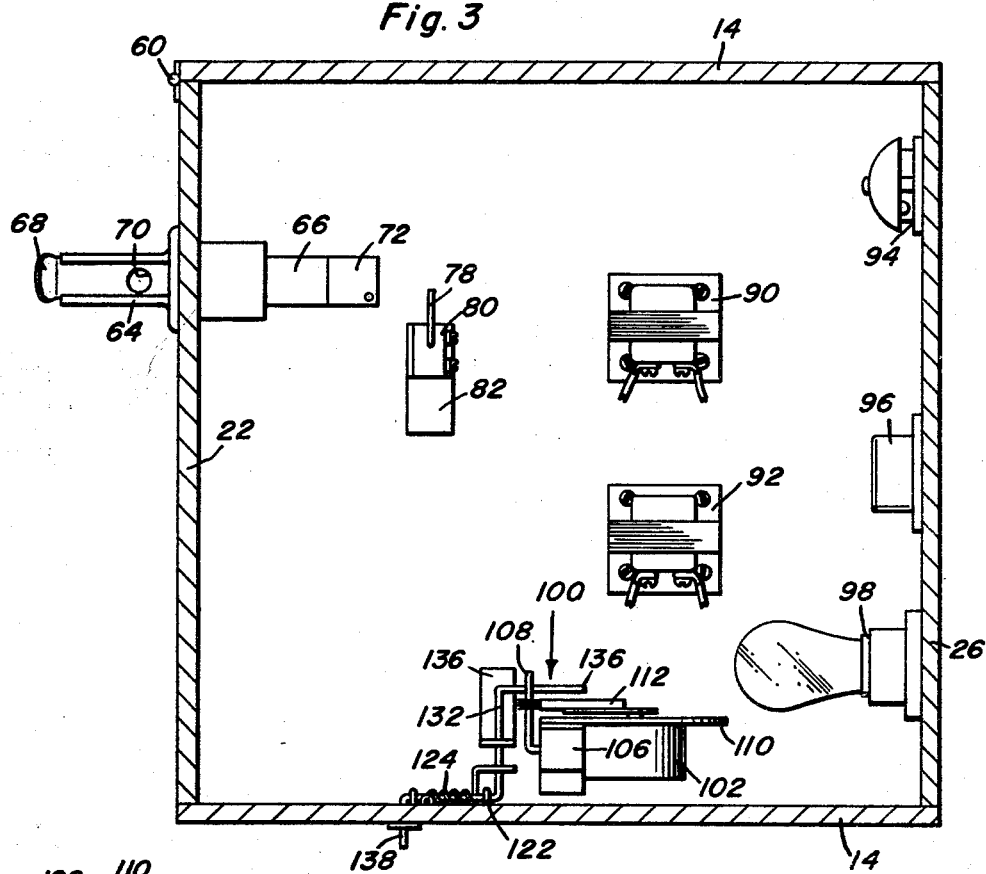
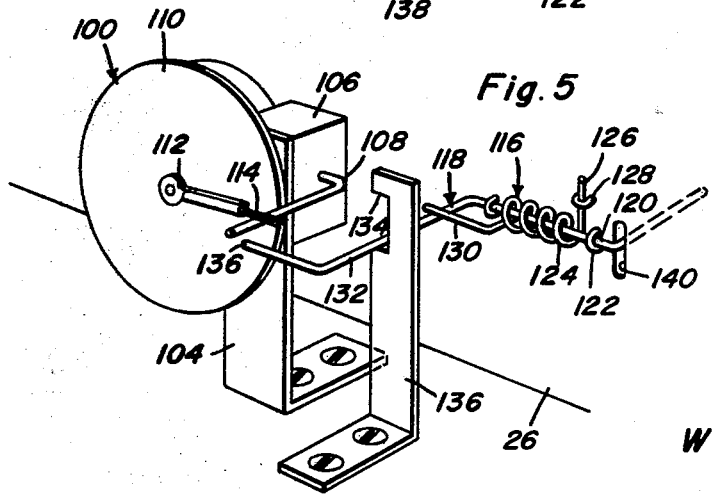

United States Patent Office 3,185,279
Patented May 25, 1965

3,185,279
VENDING MACHINE
Willard B. Spears, Box 50923, New Orleans, La.
Filed Sept. 6, 1963, Ser. No. 307,232
6 Claims. (Cl. 194—1)

The present invention generally relates to an apparatus for use in merchandising various articles and is coin-controlled.

An object of the present invention is to provide a merchandising device in the form of a self-contained structure having a plurality of articles to be merchandised displayed therein together with a pointer mechanism for indicating a particular article that may be purchased upon actuation of the apparatus of the present invention.

Another object of the present invention is to provide an apparatus in accordance with the preceding object having a coin-controlled mechanism for operating the indicator together with a mechanism for controlling the manner of operation of the indicating mechanism.

Another object of the present invention is to provide an apparatus for use in merchandising for the purpose of increasing sales, both wholesale and retail, of novelties, toys, gifts or the like that will normally sell for a fixed price such as one dollar. Further, the device introduces an amusement factor into purchase of such articles with the machine being coin-operated and having an indicating mechanism in the form of a high speed clock mechanism with a portion of the purchase price of any of the articles being inserted in the machine to operate it and the indicating mechanism indicating an article which may be purchased for the remainder of the purchase price which must be paid to the proprietor of the establishment in which the machine is installed. There is also the possibility that the operator of the machine may be eligible for a bonus choice whereby a more valuable article may be purchased at a reduced price.

A further important object of the present invention is to provide an apparatus for use in boosting sales, especially in retail establishments, inasmuch as the articles to be sold will be displayed in a locked showcase having a glass area for revealing items to be sold which may be attractively arranged. The articles purchaseable are selected by a clock mechanism having a movable pointer associated with alphabetical letters with an electric motor operating the clock mechanism whereby the pointer will point out an alphabet letter to correspond with a gift or other article displayed in a section each time the apparatus is played by the insertion of a coin. In the event the pointers stops between two letters on the clock mechanism, then the customer may choose either gift or article he wishes. A bonus selection is controlled by an electric time clock with a minute hand orientated to contact an electric switch each time it makes a complete clockwise ground for setting off an electrical signal device such as a buzzer and light for indicating to the proprietor of the establishment that a bonus choice or prize is available to the particular player. A knock-off switch will stop the buzzer and light with the knock-off switch being manually actuated. Also, at any time a selection is made, the buzzer or bell will ring to warn the operator or proprietor that someone has made a selection so that he too can see what the customer is eligible to purchase. Thus, with the present invention, a customer may purchase any article indicated by the pointer on the indicating mechanism for a known purchase price and at certain time intervals, the apparatus will indicate that a bonus selection may be had in which the customer may purchase a more valuable item at a reduced price.

Still another feature of the present invention is to provide an apparatus for increasing sales which is simple in construction, easy to operate, highly enticing and relatively inexpensive to manufacture, operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal, vertical sectional view of the apparatus illustrating the structural orientation thereof;

FIGURE 3 is a top plan sectional view taken substantially upon a plane passing along section line 3—3 of FIGURE 2 illustrating the structural details of the control mechanism for the apparatus;

FIGURE 4 is a fragmental perspective view of the slide operated switch mechanism associated with the coin-controlled device;

FIGURE 5 is a fragmental perspective view illustrating the construction of the time-controlled bonus switch mechanism illustrating the manner in which it is operated and manually re-set.

Figure 1:
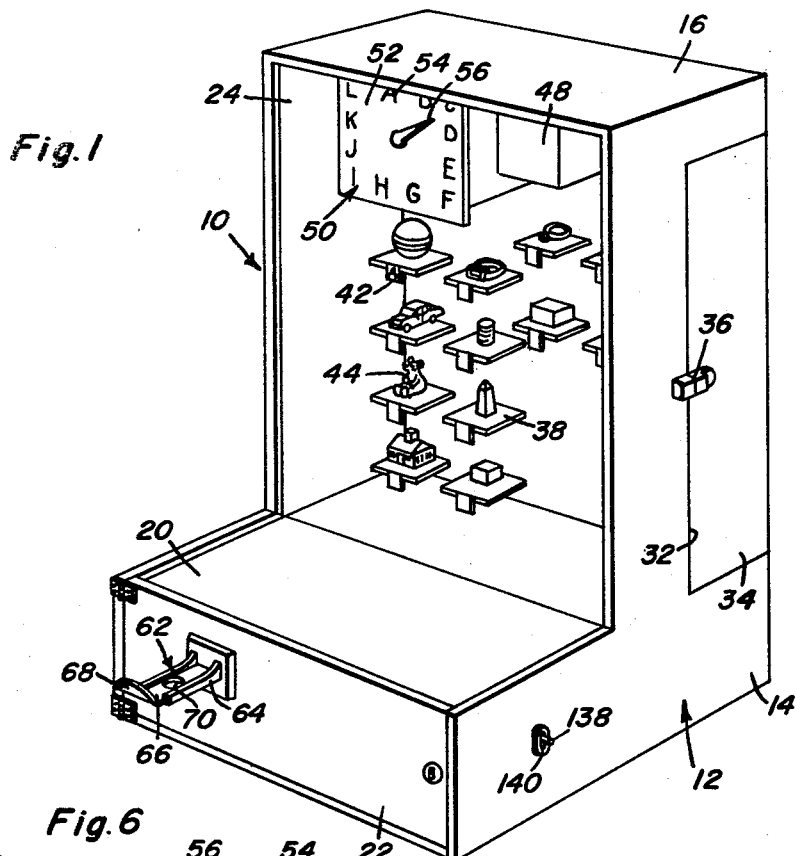
FIGURE 1 is a perspective view of the apparatus of the present invention.

Referring now specifically to the drawings, the sales increasing apparatus 10 of the present invention includes a generally L-shaped cabinet construction 12 including L-shaped side walls 14, a top wall 16 and a bottom 18. Actually, the cabinet 12 includes a double top wall including the uppermost top wall 16 and a top wall 20 for the bottom portion of the cabinet structure which also includes a partial front wall 22 joining with the forward edge of the bottom wall 18 and with the forward edge of the partial top wall 20 in conforming with the configuration with the L-shaped side walls 14. The top wall 16 interconnects the upper end of the side walls 14 and a transparent front panel of glass, plastic or the like 24 is disposed in the front of the upper portion of the cabinet structure 12 and has the lower edge thereof engaging the top wall 20 which actually extends all the way to the rear wall 26 thus forming a horizontal partition and a bottom for the upper portion of the cabinet structure. The rear wall 26 is provided with an open area 28 above the wall 20 and this is closed by a back panel or wall 30 corresponding generally in size to the transparent panel 24 and held in position by any suitable structure. The components of the cabinet may be held together in any suitable manner such as by glue, adhesive of various types, any type of fastener arrangement for providing a cabinet structure which will be longlasting and dependable.

One of the side walls 14 is provided with a vertically elongated opening 32 therein provided with a hingedly attached closure door 34 retained in closed position by suitable latch mechanism 36 thereby enabling access into the interior of the cabinet between the transparent panel 24 and the panel 30. Mounted on the panel 30 is a plurality of relatively small shelves or ledges 38 which have fastening elements 40 extending through the panel 30 for rigid attachment thereto. The forward edge of each of the shelves 38 is provided with a depending tab 42 having a letter of the alphabet disposed thereon. Supported on each of the shelves 38 is an article or item to be sold designated by numeral 44 which may be in the form of a novelty, toy, gift, or the like. The entire upper portion of the cabinet is illuminated by a light assembly 46 supported on the top wall 16 adjacent one side wall thereof and a transparent or translucent enclosure 48 of glass or plastic is attached to the top wall 16 and forms an enclosure for the light assembly 46 whereby the light assembly 46 will effectively illuminate the articles 44 supported on the shelves 38.

An indicating mechanism 50 is supported from the top wall 16 and includes a clock face or panel 52 having alphabetical letters 54 formed peripherally thereon with the alphabetical letters 54 corresponding to the alphabetical letters on the depending tabs 42. A rotatable pointer 56 is disposed in over-lying relation to the panel 52 for indicating one of the alphabetical letters 54 when it comes to rest. Thus, by rotating the pointer 56, the pointer may come to rest pointing at one of the alphabetical letters thus indicating that the item 44 appearing on the shelf with the corresponding alphabetical letter on the tab thereof may be purchased for any known price. The pointer 56 is operated by a suitable electric motor disposed within a housing 58 with the operation thereof being described in more detail hereinafter.

The bottom portion of the cabinet 12 includes a hinge supporting structure 60 for the front wall 22 enabling this to be opened with a suitable key lock mechanism being provided for securing the front wall 22 in position. Also, the front wall 22 includes a coin-controlled mechanism 62 including a guide channel 64 forming an opening through the front wall 62 and slidably receiving a slide 66 having an upturned arcuately curved finger or thumb receiving area 68 for enabling reciprocation of the slide 66. A coin receiving opening 70 is formed in the slide 66 whereby a coin may be inserted into the slide 66 and the slide forced inwardly for operating the mechanism. The coin-control mechanism insofar as the guide, the slide, the coin and the association of the coin with the lock mechanism associated therewith is conventional whereby the slide 66 may be pushed inwardly and pulled outwardly by virtue of placing a coin in the opening 70 but cannot be actuated unless the coin has been inserted in the opening 70. On the inner end of the slide 66, there is provided a bracket 72 having a depending actuating pin 74 provided with brush members 76 thereon for engagement with the actuating arm 78 of a small microswitch 80 supported on the bottom wall 18 by a Z-shaped bracket 82 and secured in place by suitable fasteners 84. Electrical conductors 86 are connected to the switch 80 in a conventional manner for enabling the switch actuating brush 76 to complete a circuit in a manner described hereinafter. A suitable removal coin box 88 is supported on the bottom wall 18 under the guide mechanism 64 to catch coins as they are inserted into the slide and the slide forced inwardly whereby the coins will be collected in the box 88 and may be removed by opening the front panel 22 in an obvious manner.

Supported on the bottom wall 18 is a pair of transformers 90 and 92 and supported on the rear wall 26 is a conventional bell structure 94, a buzzer assembly 96 and a light assembly 98 all of which are electrically interrelated in a manner described hereinafter.

Also mounted on the bottom wall 18 adjacent the side wall 14 remote from the coin control mechanism is a switch mechanism 100 which includes an electric clock mechanism 102 supported from the bottom wall 18 by a suitable angle bracket 104 which also supports a microswitch 106 having a pivotal L-shaped actuating arm 108 extending outwardly therefrom and across the periphery of a circular plate 110 in the form of a clock face. The clock mechanism 102 includes a minute hand 112 extending to a position adjacent the periphery of the plate 110 with a brush actuating assembly or member 114 forming a longitudinal extension of the minute hand 112 and engageable with the actuating arm 108 of the microswitch 106 whereby the minute hand 112 and the brush assembly 114 on the end thereof will serve as an actuating means for the microswitch 106.

A manual re-set switch or knock-off assembly 116 is associated with the switch arm 108 for returning this to a normal position. This structure includes a wire rod generally designated by numeral 118 and including an elongated portion 120 attached to and journalled on the side wall 14 by a pair of eyelets or hook-shaped retainers 122. A coil spring 124 axially encloses a portion of the wire rod member between the eyelets 122 with the coil spring 124 including a tangential extension 126 on one end thereof lying alongside of the side wall 14 and secured thereto by a fastener 128. The other end of the coil spring 124 is provided with a longitudinal extension 130 which is laterally offset in relation to the axis of the coil spring 124 and longitudinally offset in relation to the portion 120 of the wire rod 118 journalled in the eyelets or hooks 122 and the laterally offset longitudinally extending portion 130 overlies and engages a portion of a wire rod 132 disposed in perpendicular relation to the portion 120. The portion 132 of the wire rod 118 is received within the confines of a vertical notch 134 formed in an upwardly extending mounting bracket 136 whereby the arcuate swinging movement of the wire rod 118 about the axis defined by the portion 120 is limited by virtue of the portion 132 of the wire rod 118 engaging the upper and lower edges defining the notch 134. The terminal end of the wire rod portion 132 is provided with a laterally extending portion 136 in perpendicular relationship to the portion 132 and the portion 136 extends under and in perpendicular relation to the switch arm 108 for moving the switch arm 108 upwardly when the wire rod 118 is pivoted about the axis of the portion 120 which, of course, is in opposition to the direction of movement of the switch arm 108 when it is engaged by the brush actuating assembly 114 on the end of the minute hand 112 carried by the clock mechanism 100.

The end of the wire rod 118 remote from the portion 136 includes a terminal end portion 138 in perpendicular relation to the portion 120 which extends outwardly through a vertical slot 140 formed in the side wall 12 thereby forming an exterior manual actuator for the wire rod 118 thereby enabling the wire rod 118 to pivot about the axis of the portion 120 by virtue of manually moving the terminal end portion 138 vertically within the confines of the slot 140.

Figure 6:
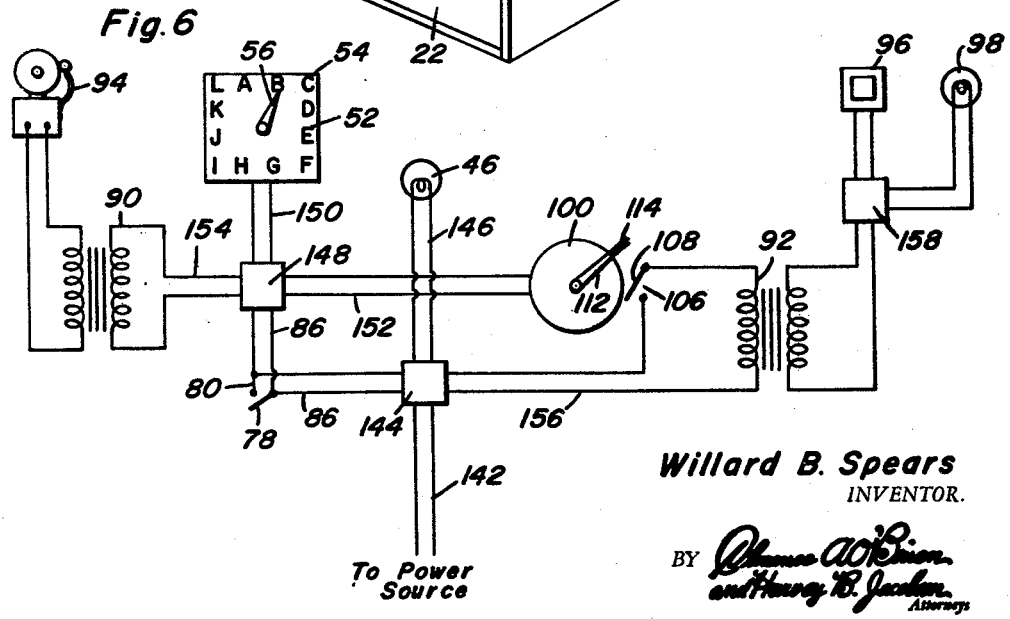
FIGURE 6 is a schematic view of the electrical circuit involved in the present invention.

As illustrated in FIGURE 6, the apparatus of the present invention is electrically connected to a suitable power source by a suitable conductor 142 which may be provided with a male plug (not shown) thereon for insertion into a conventional female outlet socket. The conductor 142 extends to a terminal board 144 where conductors 146 come off and are connected with the light assembly 46 for energizing the light. Also, conductors 86, come off to the switch 80 with the conductors 86 then extending into a terminal board 148 whereby the switch arm 78 must be closed in order to energize the terminal board 148. Extending from the terminal board 148 are conductors 150 extending to the electric motor for operating the pointer 56 whereby the pointer 56 will be moved or operated when the switch 78 is closed. Also extending from the terminal board 148 are conductors 152 extending to the electric time clock mechanism 100 for operating the minute hand 112 mounted thereon so that the brush assembly 114 will be moved peripherally whenever the switch 78 is closed. Also extending from the terminal board 148 are conductors 154 extending to transformer 90 having bell assembly 94 associated with the transformer 90 whereby the bell 94 will be actuated when the switch 78 is closed.

Extending from the terminal board 144 are conductors 156 connected with the transformer 92 and with the switch 106 whereby the switch arm 108 actuated by the minute hand 112 will close the circuit through the conductors 156 thus energizing the transformer 92 thereby energizing the terminal board 158. This will operate the buzzer 96 and the light assembly 98 thereby indicating a bonus choice in a manner described hereinafter.

Suitable instructions for operating the apparatus of the present invention may be imprinted in any convenient location on the apparatus. For example, such instructions could be printed on the exposed surface of the top wall 22 or on the transparent panel adjacent the bottom if desired. Of course, the number of shelves and articles supported together with the indicator indicia may be varied as desired.

The various conductors will be insulated to satisfy the requirement of sound construction principles.

The various terminal boards may be in the form of female sockets with the conductors extending therefrom being merely plugged into the sockets. Any suitable structure for the terminal boards and the manner of connecting the conductors thereto may be provided and the conductors secured to the apparatus structure in any suitable manner for retaining the various conductors in place.

When the machine is connected to a source of electrical power by inserting a conventional male plug into a female socket, the light 46 will be illuminated. A coin such as a quarter or the like is then inserted into the coin-controlled mechanism and the slide pushed inwardly which temporarily closes the switch arm 78 and energizes the bell 94 and the indicating mechanism and the time clock 100. Inasmuch as the brush on the slide will pass over the switch arm 78, the switch arm 78 will remain closed for only a relatively short time period. The pointer 56 will indicate an alphabetical letter or if it stops in between alphabetical letters, the customer may purchase for the remainder of the purchase price, the gift or item disposed on the shelf. This shelf is designated by a corresponding alphabetical letter on the depending tab. This purchase is made from the proprietor of the establishment in which the machine is located inasmuch as he will have a stock of the various gifts and items orientated on the shelves. Of course, the coin inserted into the coin mechanism may vary depending upon the coin mechanism used. At certain intervals, determined by the aggregate time of operation of the clock mechanism, the switch 108 will be closed which will energize light 98 and the buzzer 96 thus indicating that a bonus prize has been won by the customer thus enabling the customers to purchase a bonus selection at the same price as the items in the cabinet. The switch arm 108 is returned by virtue of the knock-off mechanism which returns the arm 108 to its position.

The bonus prize is more valuable than any one gift item selected normally and the bonus mechanism will be actuated only after a predetermined increment of actuation of the indicator mechanism thus introducing an element of chance inasmuch as the customer will not know when the bonus prize indicating buzzer and light will be energized. This enticement will introduce a considerable interest into the apparatus thus boosting and increasing the sales items displayed in the cabinet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. An apparatus for boosting sales of articles comprising a cabinet structure including a display area visible by prospective customers, a plurality of supporting shelves disposed in the display area for positioning a plurality of articles in position for observation by customers, indicia identifying the shelves, a pointer assembly mounted within the cabinet and including indicia and a movable pointer for association therewith for designating certain indicia corresponding to the indicia on the shelves for indicating a particular item, and coin control mechanism for operating the indicating mechanism, said coin control mechanism including a guide extending through the cabinet, a slide reciprocably mounted in said guide, said slide having an aperture for receiving a coin whereby the slide may be moved inwardly when a coin is in place therein, brush means carried by the inner end of the slide, and a switch member disposed adjacent the brush means and including an actuating arm for engagement by the brush means thereby closing a circuit to the indicating means upon inward movement of the slide thereby operating the pointer, a signal bell energized when the indicating mechanism is operated, a bonus choice mechanism energized when the slide is pushed inwardly and including a clock mechanism having a minute hand thereon, said minute hand having a brush mechanism, a switch in a signal circuit closed by the minute hand, the signal circuit being rendered operative upon operation of the minute hand past a predetermined point for closing the switch, said signal circuit including an audible and visual signal device energizable when the switch is closed by the minute hand.

2. The structure as defined in claim 1 wherein said switch closeable by the minute hand includes a re-set mechanism including a wire rod pivotally mounted on the interior of the cabinet and including a handle portion extending exteriorly thereof for enabling return of the switch operated by the minute hand to an open condition.

3. An apparatus for boosting sales of articles comprising a cabinet structure including a display area visible by prospective customers, a plurality of supporting shelves disposed in the display area for positioning a plurality of articles in position for observation by customers, indicia identifying the shelves, a pointer assembly mounted within the cabinet and including indicia and a movable pointer for association therewith for designating certain indicia corresponding to the indicia on the shelves for indicating a particular item, and coin control mechanism for operating the indicating mechanism, a bonus choice mechanism energized when the coin control mechanism is operated, said bonus choice mechanism including a block mechanism having a minute hand thereon, said minute hand having a flexible switch actuator, a switch in a signal circuit closed by the minute hand, the signal circuit being rendered operative upon operation of the minute hand past a predetermined point for closing the switch, said signal circuit including an audible and visual signal device energizable when the switch is closed by the minute hand.

4. An apparatus for boosting sales of articles comprising a cabinet structure including a display area visible by prospective customers, a plurality of supporting shelves disposed in the display area for positioning a plurality of articles for observation by customers, indicia identifying the shelves, a pointer assembly mounted within the cabinet and including indicia and a movable pointer for association therewith for designating certain indicia corresponding to the indicia on the shelves for indicating a particular article, and coin control mechanism, and a bonus choice mechanism energized when the coin control mechanism is operated and including a clock mechanism having a minute hand thereon, said minute hand having a flexible switch actuator, a switch in a signal circuit closed by the minute hand, said switch being closable by the minute hand when the minute hand passes a predetermined point, said switch including a reset mechanism including a wire rod pivotally mounted on the interior of the cabinet and including a handle portion extending exteriorly thereof for enabling return of the switch operated by the minute hand to an open condition.

5. An apparatus for boosting sales of articles comprising a cabinet structure including a pointer assembly mounted within the cabinet and including indicia and a movable pointer for association therewith for designating certain indicia indicating a particular item, and coin control mechanism for operating the indicating mechanism, a bonus choice mechanism energized when the coin control mechanism is operated and including a clock mechanism having a minute hand thereon, said minute hand having a flexible switch actuator, a switch in a signal circuit closed by the minute hand, the signal circuit being rendered operative upon operation of the minute hand past a predetermined point for closing the switch.

6. The structure as defined in claim 5 wherein said signal circuit includes an audible and visual signal device energizible when the switch is closed by the minute hand.

References Cited by the Examiner
UNITED STATES PATENTS

| | | | |
|---|---|---|---|
| 491,196 | 2/93 | Smith | 194—30 |
| 589,154 | 8/97 | Barnes | 194—76 |
| 2,342,018 | 2/44 | Solinki | 194—76 |
| 2,573,139 | 10/51 | Hoffman | 200—61.41 |
| 2,613,793 | 10/52 | Erickson et al. | 194—76 |
| 2,777,603 | 1/57 | Baum | 194—10 X |

SAMUEL F. COLEMAN, *Primary Examiner.*

ERNEST A. FALLER, *Examiner.*